(12) United States Patent
Daniels et al.

(10) Patent No.: US 8,180,595 B2
(45) Date of Patent: May 15, 2012

(54) PORTABLE DATA ACQUISITION SYSTEM

(75) Inventors: Jeffrey A. Daniels, Sagle, ID (US); Dave A. Mellick, Coeur d'Alene, ID (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1746 days.

(21) Appl. No.: 11/116,164

(22) Filed: Apr. 21, 2005

(65) Prior Publication Data

US 2005/0262221 A1  Nov. 24, 2005

Related U.S. Application Data

(60) Provisional application No. 60/566,225, filed on Apr. 23, 2004.

(51) Int. Cl.
*G06F 17/40* (2006.01)
(52) U.S. Cl. .................... 702/188; 702/127; 702/187
(58) Field of Classification Search .................. None
See application file for complete search history.

(56) References Cited

U.S. PATENT DOCUMENTS

| | | | |
|---|---|---|---|
| 3,863,192 A * | 1/1975 | Grey | 338/2 |
| 5,367,376 A | 11/1994 | Lagakos et al. | |
| 5,719,824 A * | 2/1998 | Boucher | 367/176 |
| 6,131,512 A * | 10/2000 | Verlinden et al. | 101/368 |
| 6,208,266 B1 | 3/2001 | Lyons et al. | |
| 6,308,230 B1 | 10/2001 | Potter et al. | |
| 6,314,811 B1 * | 11/2001 | Goldner et al. | 73/570 |
| 6,409,661 B1 | 6/2002 | Murphy | |
| 6,536,553 B1 | 3/2003 | Scanlon | |
| 7,174,277 B2 * | 2/2007 | Vock et al. | 702/188 |
| 7,180,828 B1 | 2/2007 | Sommer et al. | |
| 7,206,258 B1 | 4/2007 | Fisher et al. | |
| 2002/0033795 A1 * | 3/2002 | Shahoian et al. | 345/156 |

OTHER PUBLICATIONS

U.S. Appl. No. 60/566,225, filed Apr. 23, 2004, entitled "Portable Data Acquisition System," joint inventors Jeffrey A. Daniels and Dave A. Mellick.
Jeff Child, "PC/104 Catches Ride along PC's Trailing Edge," *COTS Journal*, Oct. 2003, p. 45.
PC/104 website homepage, http://www.pc104.org/, 2 pages printed out on Nov. 9, 2005.

(Continued)

*Primary Examiner* — Jonathan C Teixeira Moffat
(74) *Attorney, Agent, or Firm* — Howard Kaiser

(57) ABSTRACT

According to typical inventive embodiments, a compact data acquisition unit is modularly assembled of COT components, based on a PC-104 or other form factor of relatively small size. Inside a durable casing, a dc-dc converter increases battery-generated dc voltage for a computer processor that communicates with storage/memory and collects sensory information via an a-to-d converter. The inventive data acquisition unit can be implemented in either handheld (e.g., so as to include touchscreen interactivity) or situate (e.g., so as to be combined with sensory instrumentation) fashion. Especially propitious inventive practice involves wireless communication with an inventive "podded" device, remotely placed, that includes an inventive data acquisition unit, one or more sensors, and a pod containing the unit and the sensor(s). For underwater applications, a preferred embodiment of an inventive podded device is planoconvex, having a flat side for mounting on vehicular structure and an outwardly curved/rounded side for mitigating hydrodynamic penalties.

20 Claims, 21 Drawing Sheets

OTHER PUBLICATIONS

Jeffrey Daniels and Leslie Spaulding, "Acoustic Research Detachment Co-Op Presents Portable Data Acquisition System at Design Expo," *Wavelengths*, Naval Surface Warfare Center, Carderock Division, West Bethesda, Maryland, May 2003, p. 11.

"Data Acquisition Technology Helps Further Improve Sound Quality of Pianos," website of Microstar Laboratories, Inc., Bellevue, Washington, 4 pages printed out on Sep. 9, 2003 at http://www.mstarlabs.com/apeng/piano.html.

* cited by examiner

| FEATURE | DESCRIPTION |
|---|---|
| Channels | 6 analog input channels |
| Battery Powered | Currently operating off of 6 C rechargeable batteries |
| Power Requirements | 10W (2A draw) @ rest, 15W (3A draw) @ 125KSPS recording |
| Acoustically Quiet | No fans or rotating data drives |
| Portability | Enclosed in a 9"x7"x2" package |
| Environmental | 0°C to 55°C operating ambient temperature (unverified), extended ranges available using ruggedized components |
| Durability | With no mechanical parts, the system can withstand environments susceptible to high shock and vibration |

FIG. 3

| FEATURE | DESCRIPTION |
| --- | --- |
| Channels | 6 analog inputs |
| Sample Rate | 5 - 220 KSPS per channel |
| Max Throughput | 880KSPS |
| Resolution | 16-Bit |
| Converter | Each channel has a separate sigma - delta converter @ 64x the effective sample rate |
| Sampling | Simultaneous or harmonic |
| Independent Clocks | 2 independent clocks, each controls three channels |
| Inputs | Differential or single-ended |
| Voltage Input Range | ±1.25V, ±2.5V, ±5.0V, ±10.0V |
| Antialias Filtering | Set at 48% of sample rate |
| Software Calibration | All signals can be synchronized at runtime to an internal voltage |
| Data Output | Two's complement or offset binary |
| Noise | <1.5 LSB-RMS typical from 10KHz to 100KHz |
| DC Offset | ±0.8mV @ ±1.25V input range - ±1.2mV @ ±10V input range |
| Integral Nonlinearity | ±0.003 percent of full scale resolution, typical |
| Differential Nonlinearity | ±0.0015 percent of full scale resolution, maximum - No missing codes |
| Crosstalk Rejection | 84dB typical, DC-10KHz |
| Total Harmonic Distortion | 84dB typical, DC to 40% of sample rate |
| External Clocking | Allows for synchronizing multiple boards together |
| Available Drivers | Windows 2000, Linux, Labview, QNX, Matlab |
| Size | 3.75" x 3.5" x .9" |
| Power Requirement | 5W (1A draw) @ rest, 7.5W (1.5A draw) @125K sample rate |
| Environmental | 0°C to 55°C operating ambient temperature (unverified), extended range available |

FIG. 4

| FEATURE | DESCRIPTION |
|---|---|
| Processor | Transmeta 5400 5x86 |
| Speed | 533Mhz |
| Memory | 128MB SDRAM |
| Front Side Bus | 66Mhz |
| Bus | 16-Bit ISA / 32-Bit PCI |
| Ports | 2 Serial, 1 Parallel, 1 USB |
| Video Output | VGA, LCD |
| Ethernet | 10/100Mbit |
| Keyboard / Mouse | PS/2 |
| Hard Drive | Single Channel Master/Slave E-IDE supports up to UDMA-2 |
| Floppy Drive | Supports 720KB, 1.4MB, 2.8MB |
| Operating System | Supports Windows, Linux/Unix, QNX, RTOS, almost any other modern operating system |
| Benchmarks | ≈140MB/s Memory to cache throughput<br>≈27MB/s Disk I/O throughput (both tested under Red Hat Linux) |
| Size | 3.9" x 3.5" x .9" |
| Power Requirements | 5W (1A draw) @ rest, 7.5W (1.5A draw) @ max clocking |
| Environmental | 0°C to 60°C operating ambient temperature (unverified),<br>extended range available |

FIG. 5

| FEATURE | DESCRIPTION |
| --- | --- |
| Data Capacity | 1,024MB |
| Form Factor | 44 Pin, 2.5" IDE laptop drive form factor, 2.5" x 4.0" x .4" |
| UDMA | Supports up to UDMA-2 |
| Seek Time | 68 usec |
| Power Requirement | 1W (.2A draw) @ Idle, 2.5W (.5A draw) @ Read/Write |
| Environmental | 0°C to 70°C operating ambient temperature (unverified), extended range available |
| Operating Shock | 1500G (unverified) |
| Operating Vibration | 16.4Grms (unverified) |

FIG. 6

| FEATURE | DESCRIPTION |
| --- | --- |
| DC Voltage Outputs | +5V @ 10A, +12V @ 2A, -5V @ .4A, -12V @ .5A |
| DC Voltage Inputs | 6V - 40V, main input and backup battery input |
| Efficiency | 85% to 95% |
| Battery Charger Output | 9.5V to 19.5V charging voltage @ up to 4A charging current (unverified) |
| Chemistries | SLA, LiIon, NiCd, and NiMh |
| Size | 3.5" x 3.7" x .9" |
| Environmental | -40°C to 85°C operating ambient temperature (unverified) |

FIG. 7

| | |
|---|---|
| OUTPUT FILE TAG: | 031203 |
| RECORD TIME: | 30 |
| INPUT VOLTAGE RANGE: | 1.25 |
| RATE GENERATOR 1: | 588 |
| CH1 RATE DIVISOR: | 1 |
| CH2 RATE DIVISOR: | 1 |
| CH3 RATE DIVISOR: | 1 |
| RATE GENERATOR 2: | 0 |
| CH4 RATE DIVISOR: | 5 |
| CH5 RATE DIVISOR: | 5 |
| CH6 RATE DIVISOR: | 5 |

//This is an example setup file. A copy of this file would be saved with the output files
//for future reference. Additional settings could be easily added as necessary.

FIG. 9

| Setup |
|---|
| (1) Power system on, allow up to one minute for system to boot |
| (2) Attach PDAS to a client computer using an Ethernet cable, then use TELNET protocol to communicate with and control the device |
| (3) Edit setup file, for example "vi /pdas/software/pushb-1.1/pdas.def" would bring up the example setup file shown above. Make any necessary changes to the file. |
| (4) Power off device (or go straight to recording) |

| Recording |
|---|
| (1) Power system on, allow up to one minute for system to boot |
| (2) Turn recording switch to on. The hard drive lights should blink letting the user know the system is recording. |
| (3) The system will automatically power itself off at completion of the recording period. This is to help insure that a hard power off does not corrupt the operating system or data. |

| Data Retrieval |
|---|
| (1) Return recording switch to off. Power system on, allow time for system to boot |
| (2) Attach PDAS to a client computer using an Ethernet cable, use FTP protocol to communicate with the device |
| (3) Change the current directory to the "/pdas/data." Download data files using "mget *.*". |
| (4) Power off device |

FIG. 10

| SIGNAL ACQUISITION |
|---|
| • 6 Analog Inputs |
| • 5 - 220KSPS per Channel |
| • Simultaneous Sampling |
| • 16 Bit Resolution |
| • Sigma - Delta Converters |
| • Antialiasing Filters |
| • Differential Inputs |
| • Four Voltage Input Levels - ±1.25V, ±2.5V, ±5.0V, ±10.0V |
| • Low Noise, <1.5 Bits RMS |
| • Support for External Clocking and Synchronization |
| COMPUTER SUPPORT |
| • Fully Integrated x86 Processor Board |
| • 533MHz Low Power Transmeta Processor |
| • 32 Bit PCI Support |
| • 100 Mbit Ethernet Controller |
| • 2 Serial Ports, 1 Parallel Port, 1 USB |
| • Integrated VGA and LCD Controllers |
| • UDMA-2 IDE Support |
| DATA STORAGE |
| • 1-GB Solid State Drive |
| POWER |
| • Power Supply with ±5V and ±12V Outputs |
| • Integrated Battery Charger for SLA, LiIon, NiCd, and NiMh Chemistries |
| • Battery Powered |
| • Operates at 10Watts to 15Watts During Full Speed Acquisition |
| PHYSICAL CHARACTERISTICS |
| • Low Profile, 9"x7"x2" (under 1" height possible) |
| • 0°C to 55°C Operating Temperature |
| • No Acoustic Noise or Vibration Emitted |

FIG. 14

| Profile |
|---|
| Given that the system is comprised of individual modules, the profile is very flexible to different requirements. If all system components are connected in parallel it will be possible to achieve a height of approximately 0.75". This will allow PDAS to be deployed where most systems cannot. |

| Highly Rugged |
|---|
| With the absence of any mechanical components such as rotating magnetic data drives and fans, each unit can be deployed in harsh environments. This will allow recording of signals in areas that are susceptible to high shock and vibration. |

| Battery Powered |
|---|
| The current PDAS system prototype operates off of as little as 6 C Ni-Cd rechargeable batteries and is recharged by the integrated HESC-104 battery charger. Total operating time depends on the actual battery capacities used. With a slight improvement to the DC-DC converter, as elsewhere described herein, the system can record continuously for more than 5 hours. |

| Acoustically Quiet |
|---|
| As elsewhere mentioned herein, the PDAS system lacks any mechanical components. Not only does this make the system rugged, it also allows the system to operate without injecting any noise or vibration into the test environment. |

| Channel Scalability |
|---|
| While the Phase-I unit only has a single six-channel a/d board, as many as four boards can be used with a single processor. This would currently allow for systems to be developed with 24 channels. This number will soon be raised to 64 channels, as the board's manufacturer is releasing a similar 16-channel version shortly. |

| System Networking |
|---|
| Besides being able to scale up each individual unit, PDAS modules can also be networked together with the use of an Ethernet port. This will allow for channel numbers in the hundreds or even thousands. |

FIG. 15A

| External Clocking and Synchronization |
|---|
| Even in a networked scenario, channels can be synchronized together. Each a/d board allows for external clocking as well as synchronization of the sigma-delta oversampling factor. This will also allow for PDAS modules to be integrated into existing data-acquisition systems. |

| Storage Scalability |
|---|
| The current processor board can handle two IDE drives. Bitmicro's solid-state drives have capacities of up to 37GB in a 2.5" form factor and 155GB in a 3.5" form factor. This will allow for a maximum storage capacity of 310GB in solid-state technology. |

| Additional PC-104 and PCI Boards |
|---|
| PC-104 is quickly becoming a major player in the embedded systems world. As a result, numerous companies are now developing different types of PC-104 modules. Some of the current modules on the market are GPS receivers, IRIG time decoders, wireless networking cards, and also analog output boards. Even digital cameras could be added. Additionally, all standard size PC cards can be interfaced to PC-104 systems with the help of an adapter. Phase-II units can make use of any of these devices. |

| Embedded and Non-Embedded Systems |
|---|
| Because the processor board is highly integrated with peripherals, not only can the units be embedded but they can also serve as fully interactive systems. Using the PDAS system's VGA or LCD output, along with keyboard and mouse input support, interactive desktop or even laptop units are possible. |

| Low Cost Systems |
|---|
| The largest expense for a full scale PDAS system would be the solid-state storage, as much as approx. $30,000 for a 37GB hard drive. However, traditional magnetic drives could also be utilized in non-rugged systems. The downside to this would be: introduction of higher power consumption, acoustic noise and vibration into the system; absence of real-time data de-multiplexing; greater susceptibility of the unit to failure in harsh environments. |

FIG. 15B

| |
|---|
| Boost Power Supply |
| The current power supply utilizes a buck converter. This requires an input voltage of at least 6 volts, equal to a minimum of 6 battery cells. Future systems will make use of a boost converter that requires only 2 volts in to achieve the desired 5 volts out. This will permit either operation with one third the number of cells or provide three times the capacity if the same number of cells are placed in parallel. |
| |
| Miniature Fuel Cells |
| While batteries will be able to provide sufficient energy capacities for the near future, the soon to be released laptop fuel cells will provided extended periods of operation. At such a time, the transition should require no additional hardware or redesign of the system. |
| |
| Digital to Analog Outputs |
| In addition to the PC-104 analog to digital board that is currently being used in the system, a similar PC-104 digital to analog converter board from the same company could be added to the system. This would extend the capabilities of the system from just a receiver to a full communication system. Possible applications of this would be for broadband embedded pingers or Acoustic Tracking and Communications Systems (ATACS). |

FIG. 16

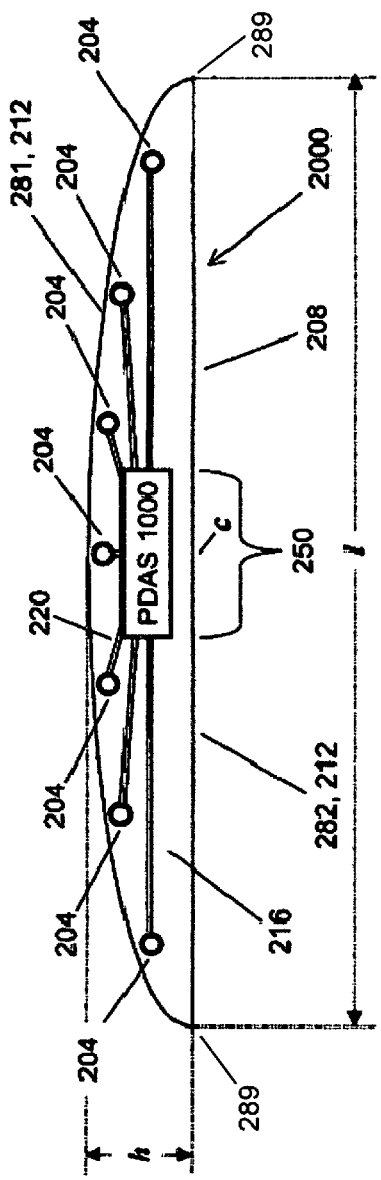
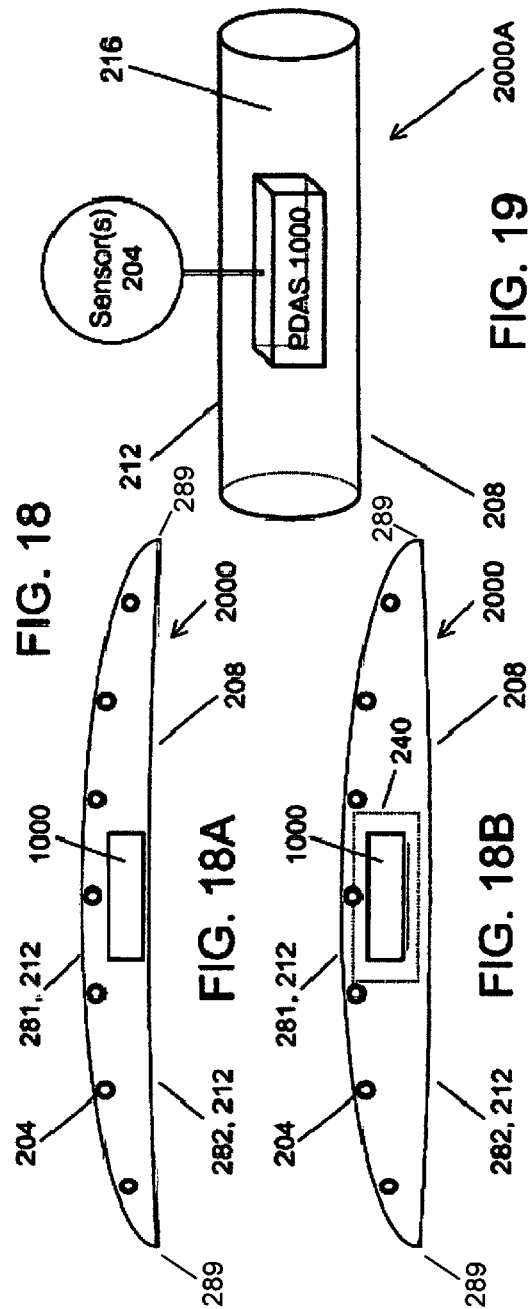
FIG. 18
FIG. 18A
FIG. 18B
FIG. 19

PORTABLE DATA ACQUISITION SYSTEM

CROSS-REFERENCE TO RELATED APPLICATIONS

This application claims the benefit of U.S. provisional application No. 60/566,225, filed 23 Apr. 2004, hereby incorporated herein by reference, entitled "Portable Data Acquisition System," joint inventors Jeffrey A. Daniels and Dave A. Mellick.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to data acquisition, more particularly to methods and devices for acquiring data from sensors characterized by unfavorable placement such as in terms of accessibility or associability of apparatus.

Many applications require the placement of sensors in locations that are remote or hard-to-reach or not conducive to the association of instrumentation. The acquisition of sensor data in such applications can be difficult or impractical.

The U.S. Navy, for instance, conducts testing of both model-scale and full-scale marine vessels, such as involving acoustic evaluation. Some locations on the marine vessel (e.g., sail, control surfaces, certain areas of the hull) do not readily lend themselves to external situation of sensors and other instrumentation. External hull placement of sensors can be undesirable due to mechanical unfeasibility of sensor mounting (e.g., absence of proximate hull penetrators for facilitating sensor mounting) or adverse hydrodynamic ramifications (e.g., flow disturbance) of sensor mounting. Further, some naval vessels require sensor arrays to operate during navigation to monitor acoustic performance (e.g., to detect and record problems such as structure-born noise). The installation of sensor capability in the vicinity of a noise source would obviate extraordinary sensing measures involving equipment conveyance to the suspected location of noise generation.

SUMMARY OF THE INVENTION

The present invention's "Portable Data Acquisition System" ("PDAS") meets the aforementioned needs. As typically embodied, the inventive system is a small, completely self-contained, battery-powered, low profile, scaleable, rugged, lightweight, compact, data acquisition system. Use of the present invention's portable data acquisition system is of interest to the U.S. Navy, for instance, for embedded applications as a high-speed data recorder for precision instrumentation such as accelerometers. A typical inventive PDAS is a robust, integral, compact unit that is smaller than a conventional laptop computer. An inventive prototypical "situate" embodiment that was made by the U.S. Navy is representative in terms of size, measuring about 7"×5"×1". An inventive "handheld" embodiment might measure, say, about 3.5"× 3.5"×7". The present invention's portable data acquisition system affords superior performance and lower costs.

According to many inventive embodiments, the present invention's PDAS is combined with one or more sensors such as motion sensors (e.g., accelerometers or velocimeters) or pressure sensors (e.g., hydrophones). An inventive integral combination including an inventive PDAS, one or more sensors (e.g., a sensor array) and a housing can be mounted externally (e.g., on a marine vessel), or used in handheld fashion as an easy-to-use device (e.g., for onboard monitoring). For instance, an inventive PDAS and an array of sensors can be encapsulated, encased or embedded in a matrix material, thereby forming an inventive integral device that is adaptable to attachment to a structure of interest. The matrix can describe a selected external surface shape, depending upon the projected application. Some marine applications may require an exterior matrix shape that is hydrodynamically contoured, e.g., characterized by appropriate degrees of curvature, flatness and smoothness so as to facilitate coupling with a marine hull and yet minimize drag when so coupled.

The present invention's PDAS, as typically embodied, is a fully integrated and highly adaptable data-recorder. Based on commercial-off-the-shelf (COTS) and PC-104 modular technology, a typical PDAS system can range in size between a single six-channel unit and a large network of up to sixty-four channel modules. Typically designed for low-power embedded applications, an inventive six-channel system comes fully capable of running entirely off of minimal battery power. The low power requirements allow for operation with only passive cooling. In addition to the advantage of no fan, the inventive system typically allows for data storage without the use of mechanically noisy magnetic drives. Data storage can be handled entirely by solid-state technology. The aforementioned inventive PDAS test prototype ("bench model") made by the U.S. Navy was specifically designed for a minimized profile; this prototypical single six-channel data-recorder, with power, can fit in a compact space of seven inches by five inches by one inch (7"×5"×1").

According to typical inventive embodiments, the PDAS is capable of recording a minimum of six channels simultaneously at speeds up to 220 KSPS. Data storage for a typical inventive system is entirely solid-state, with capacities as high as 310 GB, allowing for extended recording periods even at high acquisition speeds. A very high capability system can record 64 channels simultaneously at about 220 KHZ, yet be smaller than a computer keyboard and not be prohibitively expensive. Frequently, two solid-state hard drives represent 75% of the cost. By operating entirely off of minimal battery power, the inventive system is equipped to record in remote areas previously unreachable or unattainable. The present invention's PDAS design typically uses commercial-off-the-shelf (COTS) components, which allows for a rapid development time at a fraction of the costs of most other data acquisition systems.

Many of the numerous possible embodiments of the present invention fall into either of two categories, generally defined herein in terms of the respective types of applications, viz., (i) the "situate" variety of inventive devices and (ii) the "handheld" variety of inventive devices. Every inventive PDAS device has a functionality that is determined by the associated user-defined software. The potential multifarious inventive applications reside in commercial, industrial, educational, R & D and military realms. Typically based on a modular PC-104 design, inventive practice is capable of adapting to a multitude of environments and contexts, including mounting to a ship's hull, embedding in a ship's propeller, or being handheld for daily use or for structure-born noise applications.

As mentioned hereinabove, some inventive embodiments are referred to herein as being of the "situate" genre. An inventive situate PDAS can be used, for instance, as a rugged acquisition and/or control system that is especially useful in embedded fashion or in certain environments, e.g., harsh environments, underwater environments, environments where noise or vibration is not desirable, or environments lacking power supply availability. The situate application mode encompasses many possible naval applications (e.g., external monitoring of ship flow noise and/or self-noise) that may translate into commercial applications. As an example, an inventive situate PDAS can be encapsulated (e.g., embedded or encased) in a matrix to form an inventive integral device for both sensing physical phenomena and acquiring data. The inventive integral device can be designed to be both attachable and detachable. The matrix should be transparent to the physical phenomena being measured, e.g., acoustically transparent for sound measurements. An inventive situate system can be used in unmanned vehicles, e.g., an unmanned underwater vehicle (UUV) or an unmanned aerial vehicle (UAV), for communication as well as for data acquisition.

In accordance with typical inventive embodiments suitable for "situate" utilization, a method is provided for performing sensing and for acquiring data based on the sensing. The inventive method comprises attaching an inventive self-contained unit to an object. The inventive self-contained unit includes a data acquisition device, at least one sensor (e.g., at least one motion sensor and/or at least one pressure sensor), and a pod enclosing the data acquisition device and the at least one sensor. The data acquisition device includes a processor for receiving signals from the at least one sensor. Typically, the data acquisition device further includes a direct current power supply, a direct current-to-direct current converter between the direct current power supply and the processor, storage means for data associated with the processor, and a housing (for the processor, the direct current power supply, the direct current-to-direct current converter, and the storage means). Typically, one or more inventive practitioners can communicate with the inventive self-contained unit from one or more remote locations.

As frequently embodied, the present invention's pod has a planoconvex outside pod surface that includes a smooth convex outside pod surface and a flat outside pod surface. The object has an outside object surface that is flat or curved or some combination thereof. The attaching of the self-contained unit to the object includes adjoining the flat outside pod surface to the outside object surface. If the object is a marine vessel, usual inventive practice provides that the attaching is performed so that the smooth convex outside pod surface is exposed but the flat outside pod surface is not exposed, and so that the planoconvex outside pod surface has a minimal amount of drag associated therewith when the self-contained unit is in an attached state with respect to the marine vessel during travel. If the outside object surface is flat, then the flat outside pod surface will naturally be conformal, or at least substantially conformal, with respect to the flat configuration of the outside object surface. According to many inventive embodiments, the pod is characterized by flexibility, thus facilitating attachment to outside object surfaces that are characterized by some degree of curvature. The attaching to the object of an inventive self-contained unit that includes a flexible pod can be effected in such a way that the pod flexibly changes shape, the flat outside pod surface thus becoming curved in a configuration that at least substantially conforms to the curved configuration of the outside object surface.

As also mentioned hereinabove, some inventive embodiments are referred to herein as being of the "handheld" genre. A typical inventive handheld PDAS has at least one of three primary applications, viz., as data loggers, data analyzers, and data controllers. All three inventive handheld applications can be useful in a variety of contexts, including military, commercial, educational, industrial (e.g., automotive and aerospace), and research and development. Any research requiring portable high bandwidth data analysis, such as wideband audio or vibration analysis, can benefit from an inventive handheld PDAS device. Among the notable uses is as a small, handheld, interactive, portable system for monitoring structure-born noise during acoustic trials, especially in naval or other military contexts.

In accordance with typical inventive embodiments suitable for "handheld" utilization, a combination comprises sensory means and data acquisition means. The sensory means includes at least one sensor. The data acquisition means includes a processor for receiving signals from the at least one sensor, a direct current power supply, a direct current-to-direct current converter for changing the voltage obtained by the processor from the direct current power supply, storage means for information associated with the processor, and an outer casing. The outer casing is for the processor, the direct current power supply, the direct current-to-direct current converter, and the storage means. Resident in the storage means is a computer program product including a computer useable medium having computer program logic recorded thereon for enabling the processor to process data related to the signals. According to some inventive embodiments, the combination further comprises one or more physical connections (e.g., wires) between the sensory means and the data acquisition means. According to frequent inventive practice, the data acquisition means further includes a touchscreen display for facilitating interactivity between a user and the processor, the computer useable medium having computer program logic recorded thereon for enabling the interactivity. The outer casing describes an approximate geometric rectangular prism shape having six geometric sides, the touchscreen display being situated at one geometric side.

There are two types of handheld devices on the market currently, namely, low bandwidth standalone data loggers and laptop-attachable medium bandwidth real-time analyzers. Current stand-alone data loggers typically have a 10-20 kHz bandwidth and only have very limited data storage. Analyzers that are attached to laptops achieve a 20-40 kHz bandwidth and are limited in data storage to the laptop's hard drive size. However, there are currently no known portable devices on the market that integrate the computer/laptop support and the acquisition/control into a single device, such as accomplished by the present invention's PDAS.

Other objects, advantages and features of the present invention will become apparent from the following detailed description of the invention when considered in conjunction with the accompanying drawings.

BRIEF DESCRIPTION OF THE DRAWINGS

The present invention will now be described, by way of example, with reference to the accompanying drawings, wherein like numbers indicate the same or similar components, and wherein:

FIG. 3 is a table setting forth specifications for an inventive PDAS prototype based on FIG. 2.

FIG. 4 is a table setting forth specifications for the analog-to-digital converter component of the inventive PDAS prototype represented in FIG. 2 and FIG. 3.

FIG. 5 is a table setting forth specifications for the PC-104 motherboard component of the inventive PDAS prototype represented in FIG. 2 and FIG. 3.

FIG. 6 is a table setting forth specifications for the data storage component of the inventive PDAS prototype represented in FIG. 2 and FIG. 3.

FIG. 7 is a table setting forth specifications for the power supply component (and the optional power supply charger component for a rechargeable power supply) of the inventive PDAS prototype represented in FIG. 2 and FIG. 3.

FIG. 9 is an example of a setup file for embedded practice in accordance with the present invention.

FIG. 10 is an example of an inventive procedure for effecting setup, recording and retrieval in the context of embedded practice in accordance with the present invention.

FIG. 14 is a table setting forth various features of the inventive PDAS prototype represented in FIG. 2 and FIG. 3, such features relating to signal acquisition, computer support, data storage, power and physical characteristics.

FIG. 15A and FIG. 15B are tables setting forth various other features of the inventive PDAS prototype represented in FIG. 2 and FIG. 3, such features relating to profile, ruggedness, battery power, quietude, channel scalability, system networking, external clocking and synchronization, storage scalability, additional PC-104 and PCI boards, embedded versus non-embedded nature, and cost.

FIG. 16 is a table setting forth some inventive features representing possible improvements to the inventive PDAS prototype represented in FIG. 2 and FIG. 3, such features relating to increase in power supply, use of miniature fuel cells, and use of additional digital-to-analog outputs.

FIG. 18, FIG. 18A and FIG. 18B are cross-sectional elevation views of inventive embodiments each having a plan form such as shown in FIG. 17. FIG. 18, FIG. 18A and FIG. 18B depict three somewhat differently shaped pods, each pod having the same or the equivalent convex upper surface. The three pods differ in shape insofar as having planar, concave and convex lower surfaces, respectively. These inventive "podded" device embodiments are suitable for flush attachment to flat, slightly curved or moderately curved exterior surface portions of structures such as marine hulls.

FIG. 19 is a perspective view an embodiment of a PDAS-inclusive, sensor-exclusive, "podded" device in accordance with the present invention. This inventive data acquisition device, which has a cylindrical shape, is suitable for instance for mounting in a compartment or a rotating part of a marine vessel.

DETAILED DESCRIPTION OF THE INVENTION

Figure 1:
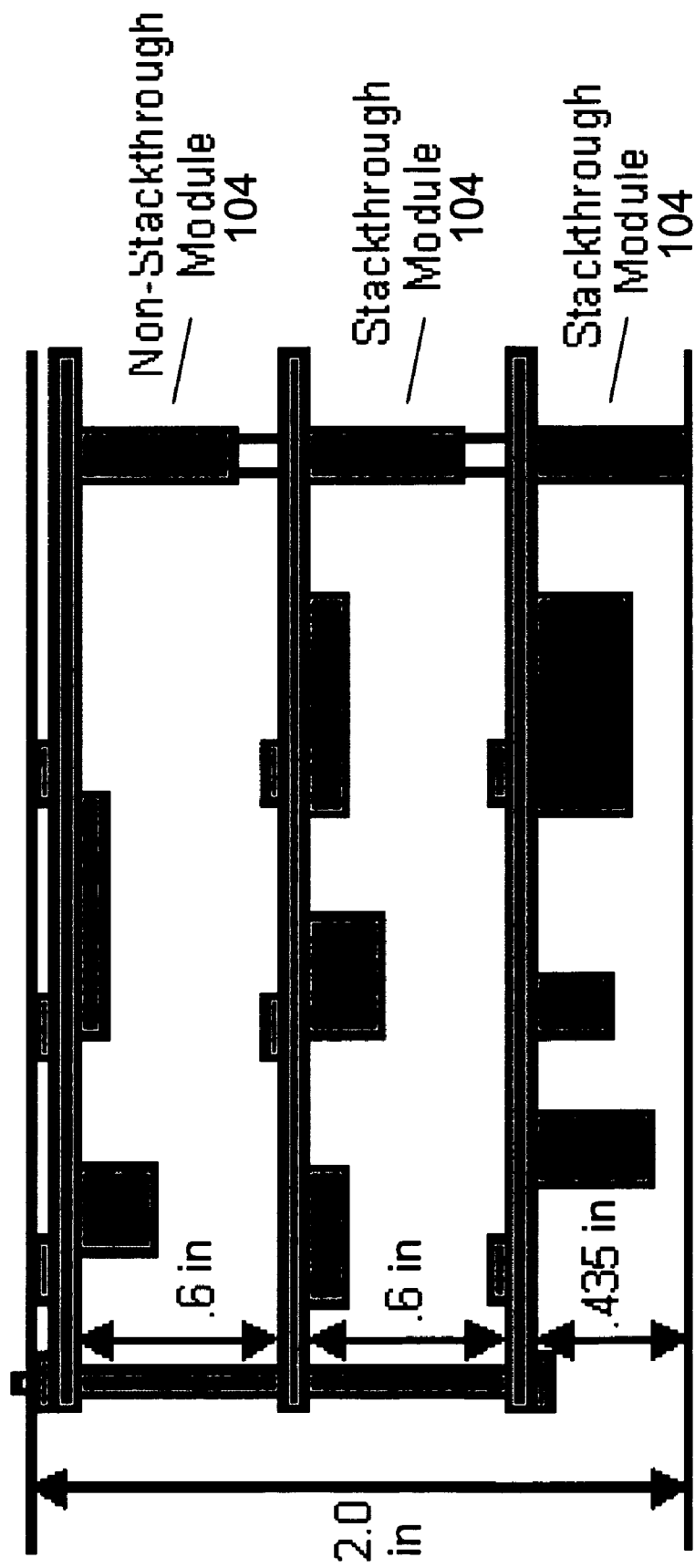
FIG. 1 is an elevation view of three PC-104 modules in a stacked configuration.

Reference is now made to FIG. 1, which illustrates the stacking of three PC-104 modules 104. The source of the diagram shown in FIG. 1 is the PC-104 Consortium, which describes itself in its website (http://www.pc104.org/) as "a Consortium of over 100 members world wide who have joined together to disseminate information about PC/104 and to provide a liaison function between PC/104 and standard organizations." The inventive system is designed around the PC-104 form factor; the PC-104 form presents a variety of design possibilities for inventive practice. According to some inventive embodiments, each module 104 with the PC-104 form factor is ≈3.5"×3.5"×1" in size. The modules contain both a 16-bit ISA and a 32-bit PCI bus running vertically through the board. This allows the PC-104 modules 104 to be directly stacked together, as shown in FIG. 1. In addition to stacking, PC-104 boards 104 can also be connected in parallel with the help of a custom back plane or cabling system, allowing the entire inventive system to achieve a profile of less than one inch.

Figure 2:
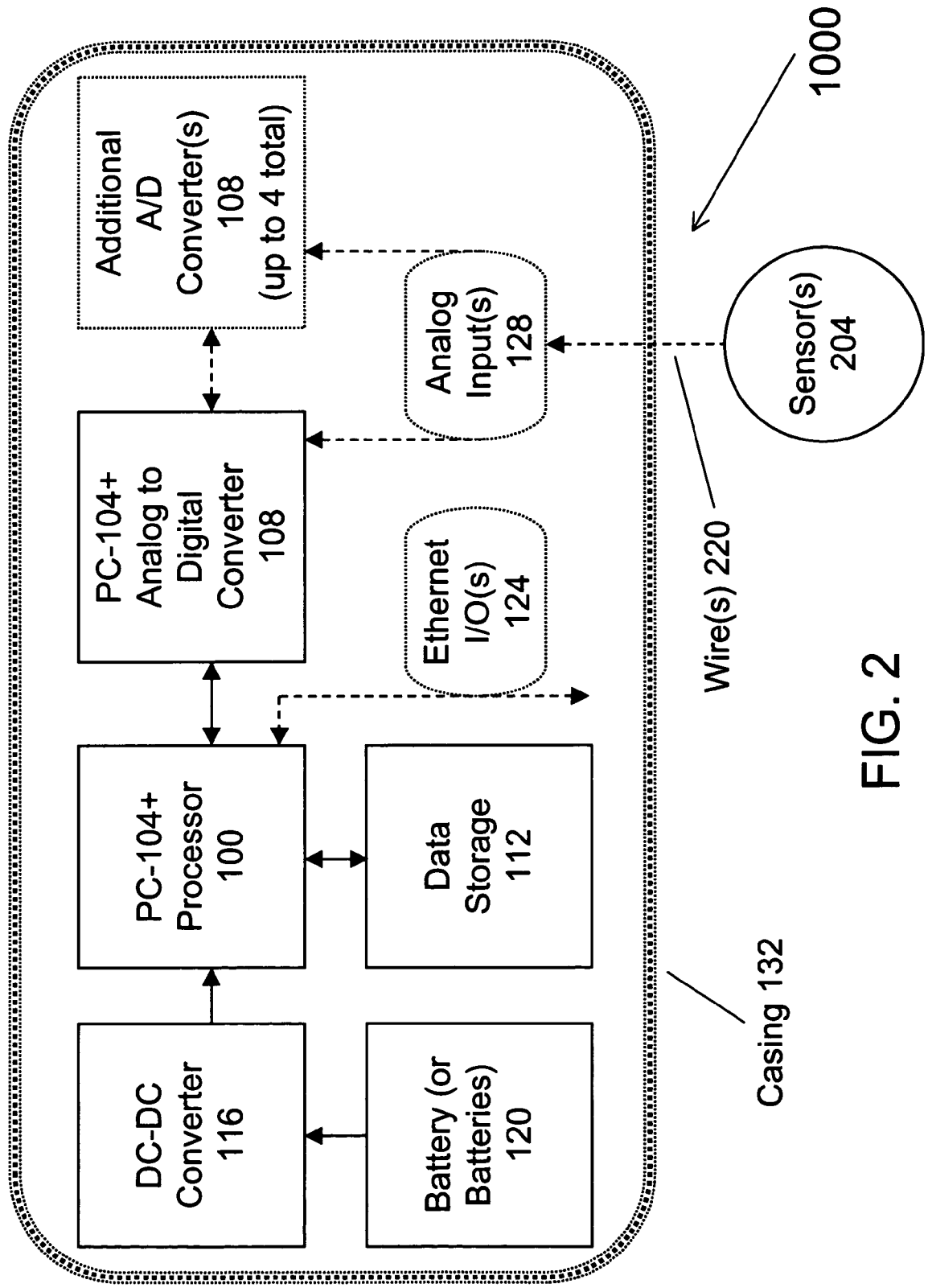
FIG. 2 is a schematic of an embodiment of a Portable Data Acquisition System (PDAS) in accordance with the present invention.

The present invention's hardware design, as typically embodied, is now described with reference to FIG. 2, which illustrates the typical layout of the inventive system. FIG. 2 is a block diagram of a single PDAS unit 1000 as typically embodied according to inventive practice. The present invention's PDAS unit 1000 includes the following: a PC-104+ processor board 100; one or more PC-104+ analog-to-digital converters 108; data storage 112; a dc-dc power converter 116; and, a power source (e.g., one or more batteries) 120. Typically, these key components of an inventive PDAS unit 1000 are commercial off-the-shelf (COTS) items. According to usual inventive practice, PDAS 1000 also includes at least one ethernet input-output port 124 and at least one analog input port 128. As shown in FIG. 2, inventive PDAS unit 1000 provides for at least one PC-104+ analog-to-digital converter 108, with the option of providing for up to five total PC-104+ analog-to-digital converters 108. Each A-to-D converter 108 corresponds to an A-input port 128. The sensory information in the form of analog electrical signals is transmitted from sensor(s) 204 to A-to-D converter(s) 108 via A-input port(s) 128. According to some inventive embodiments, the sensory information is transmitted through wires 220 that connect sensor(s) 204 with A-to-D converter(s) 108 via A-input port(s) 128. Also diagrammatically portrayed is a casing 132 that typically is made of a metal, plastic or composite material.

With reference to FIG. 3 through FIG. 8, given that the inventive system 1000 prototype is highly modularized and thus easily adaptable, specifications are provided herein for both the total system 1000 as well as for each of its individual components. Total hardware specifications, i.e., for the overall inventive system 1000, are listed in FIG. 3. Individual component specifications, i.e., for each individual component of inventive system 1000, are listed in FIG. 4 through FIG. 7. Because of the versatility of inventive system 1000, many different applications and corresponding requirements are possible. It may be helpful, in inventive practice, to separately document each component in order to facilitate calculation (or approximate calculation) of the specifications for an original or modified system 1000.

Figure 8:
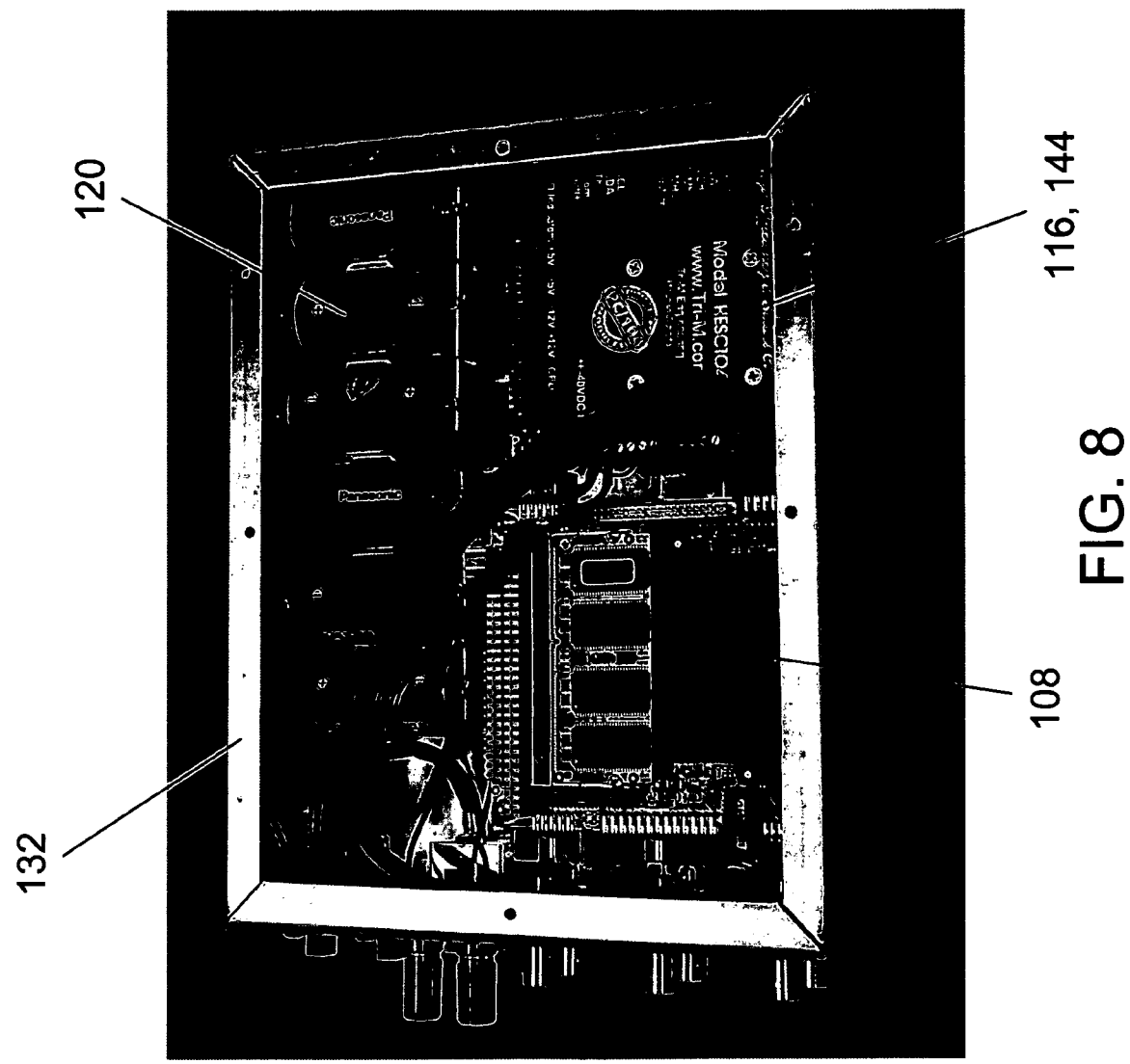
FIG. 8 is a photograph of the inventive PDAS prototype represented in FIG. 2 and FIG. 3.
Figure 21:
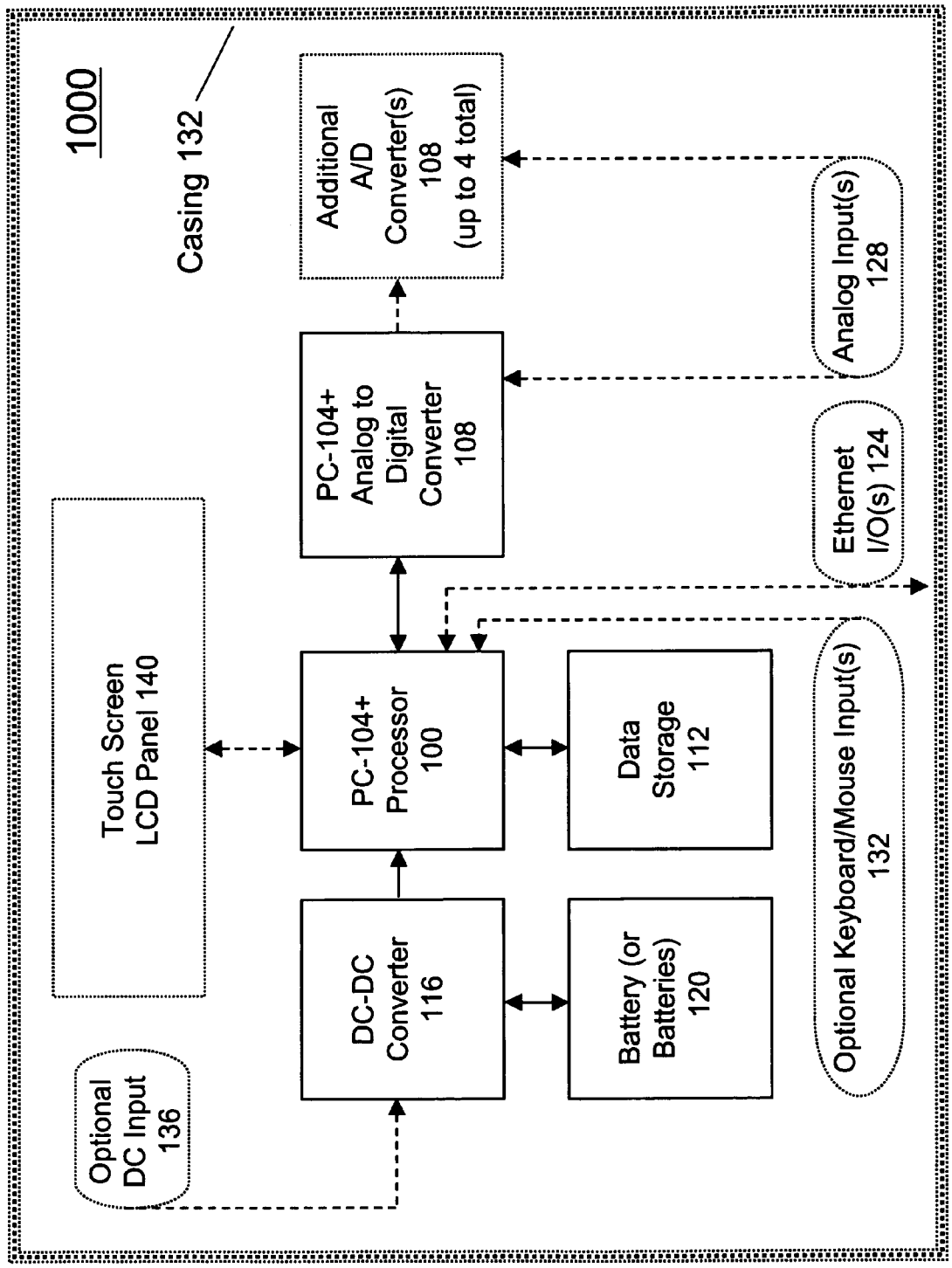
FIG. 21 is a schematic of an inventive embodiment similar to that shown in FIG. 2, particularly illustrating the inclusion of a touch screen LCD panel suitable for interactive handheld use. The inventive embodiment shown in FIG. 21 is capable of being inventively packaged in a manner such as shown in FIG. 20.

The prototypical PDAS system 1000 that was made as a bench model by the present inventors as employees of the U.S. Navy is pictured in FIG. 8. This inventive test prototype is designed around the highly integrated PC-104 6SDI A/D data acquisition board 108, manufactured by General Standards Corp., 8302 Whitesburg Drive, Huntsville, Ala. Handling the processing for the inventive bench model unit 1000 is a PC-104 TM5400 processor board 100, manufactured by Technoland, 1050 Stewart Drive, Sunnyvale, Calif. Regarding the processor board 100, Technoland's TM5400 processor board was selected to replace the originally selected MZ104+ processor board, manufactured by Tri-M Engineering, 1407 Kebet Way, Port Coquitlam, British Columbia, Canada; problems seemed to have arisen with the MZ104+ processor board, such as an inability to enable bus mastering, and a lack of operating system support for UDMA, both important aspects of the inventive system 1000. Data storage is accomplished by using an E-Disk 112, a solid-state drive from BITMICRO Networks, Inc., 45550 Northport Loop East, Fremont, Calif. Power is supplied to the system by six Panasonic batteries 120, a HESC104 dc-dc converter 116, and a magnetic induction battery charger 144 (such as shown in FIG. 21) from the aforementioned Tri-M Systems. The rectangular (box-shaped) metal casing 132 is shown with the detachable top face removed.

FIG. 4 provides PC-104 6SDI analog-to-digital board 108 specifications. FIG. 5 provides PC-104 TM5400 processor board 100 specifications. FIG. 6 provides E-Disk solid-state data drive 112 specifications. FIG. 7 provides Hesc-104 power supply and battery charger specifications. Unless otherwise stated in FIG. 4 through FIG. 7, all figures and system measurements documented therein were tested to verify the supplier's documentation. Measurements of the inventive system 1000 were made after the processor 100, a/d board 108, solid-state drive 112, and power supply elements 116, 120 and 136 had been integrated into a single standalone unit 1000. This was done so as to test for any signal characteristic problems that might have developed as the result of component integration. The testing was conducted at room temperature with minimal vibration. For signal characterization tests, a shielded enclosure was placed around the unit 1000.

The inventive bench model 1000 has an operating system, drivers, and embedded software. Chosen as the operating system for inventive bench model unit 1000 was Red Hat Linux 8.0. Any version of Linux with a 2.4 kernel would have been acceptable. This is because the Linux drivers for the analog-to-digital board 108 are only compatible with 2.4 kernels. Aside from the purchase price benefit (Linux and Linux drivers are available free of charge), Linux provided a customizable embedded operating system platform that may not have been possible under Microsoft Windows. Linux allowed for customizing most or all aspects of the inventive system 1000, including processing overhead, minimizing memory footprint, and the development of startup scripts for embedded applications. While Linux has proven itself with respect to inventive bench model unit 1000, future applications contemplated by the U.S. Navy, and inventive practice in general, will be able to take advantage of a wide range of other possible platforms. For inventive PDAS applications that require a user interface, a more appropriate operating system such as Windows can be utilized. A benefit of Windows would be the use of a wide range of drivers, including Windows NT/2000, Labview, Matlab, Solaris and others.

Two pieces of software were written in the development of the inventive PDAS 1000 bench model, viz., an entirely embeddable script and a graphical user interface test platform. Given that the focus of this early phase development was for embedded applications, only the script is documented herein. One of the requirements for the inventive system was to be able to begin recording at a given condition, such as a particular depth. To achieve this, an external trigger input was added to the bench model unit 1000 that communicates to the processor 100 via the serial input port 128. For the bench model unit 1000, a simple slide switch represents this trigger. Later inventive models 1000 contemplated by the U.S. Navy will most likely make use of a pressure switch to control power to the inventive unit 1000, and the trigger switch will be used to control whether or not the system should begin recording upon booting up.

Reference is now made to FIG. 9, which shows an example setup file for embedded applications. The system's triggering device is used to start recording using a startup script. This script's only input is a setup file that is defined prior to recording. The setup file allows the user to define all aspects of how the system should perform while recording, file output names, length of recording time, and any additional comments about the system setup. A copy of the setup file is maintained with the output data files for future reference. What the embedded script returns are six data files, one per channel. Each file is named using the tag specified in the setup file with a channel number as an extension, such as "031303.ch5" describes channel 5 recorded on Mar. 13, 2003, for example. Also returned is a copy of the setup file, as well an error log file in the event that a problem with the system occurred while recording.

FIG. 10 provides an example of embedded operation. As shown in FIG. 10, the inventive system can be operated from setup to data retrieval. FIG. 10 is merely illustrative, specifically as to the inventive bench model 1000, and does not represent a complete user manual. Many other embodiments of inventive system 1000 will likely differ with respect to powering on as well as with respect to triggering to begin recording.

Figure 11:
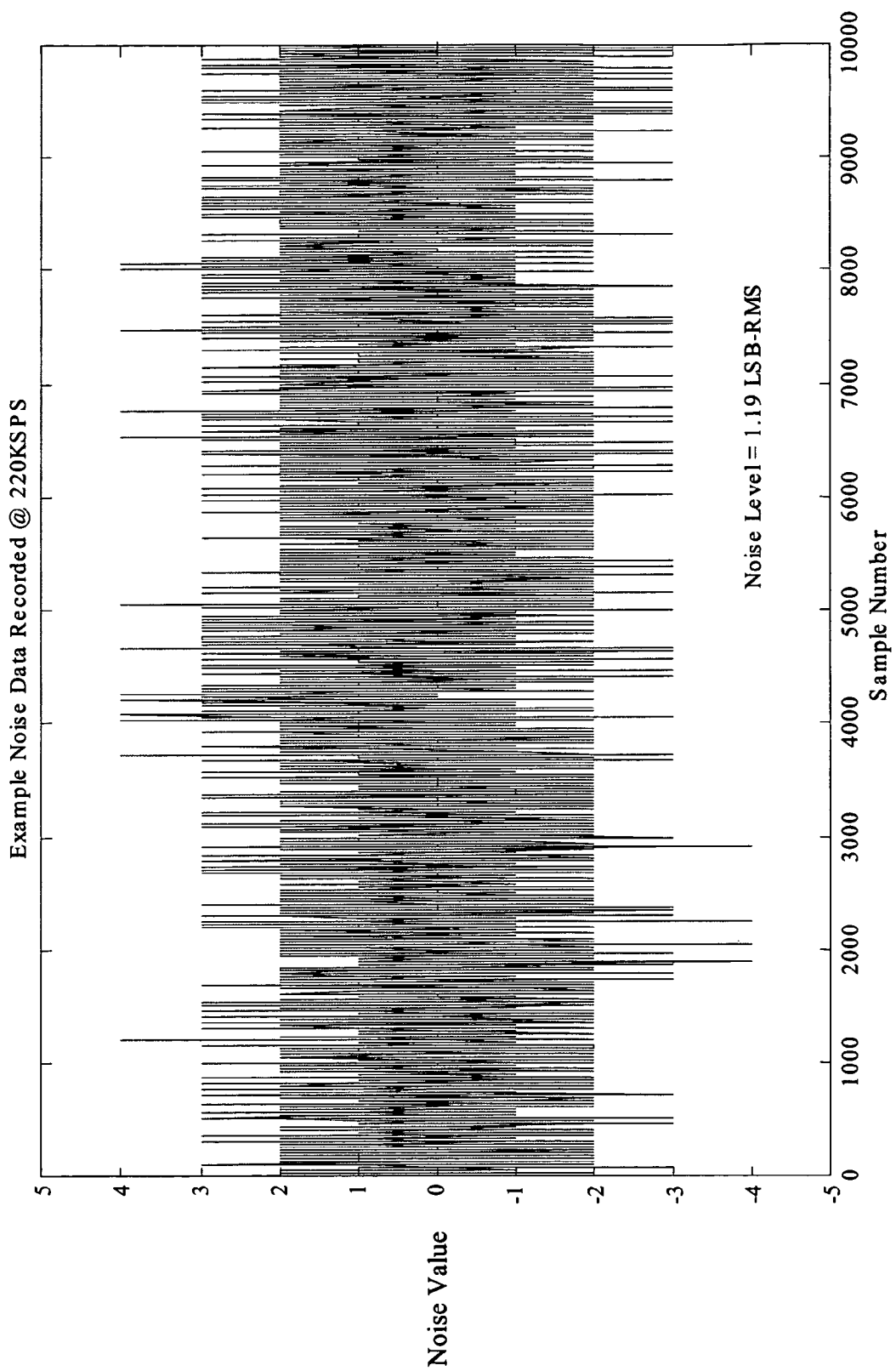
FIG. 11, FIG. 12 and FIG. 13 are examples of graphical data that are recorded through embedded practice in accordance with the present invention.
Figure 12:
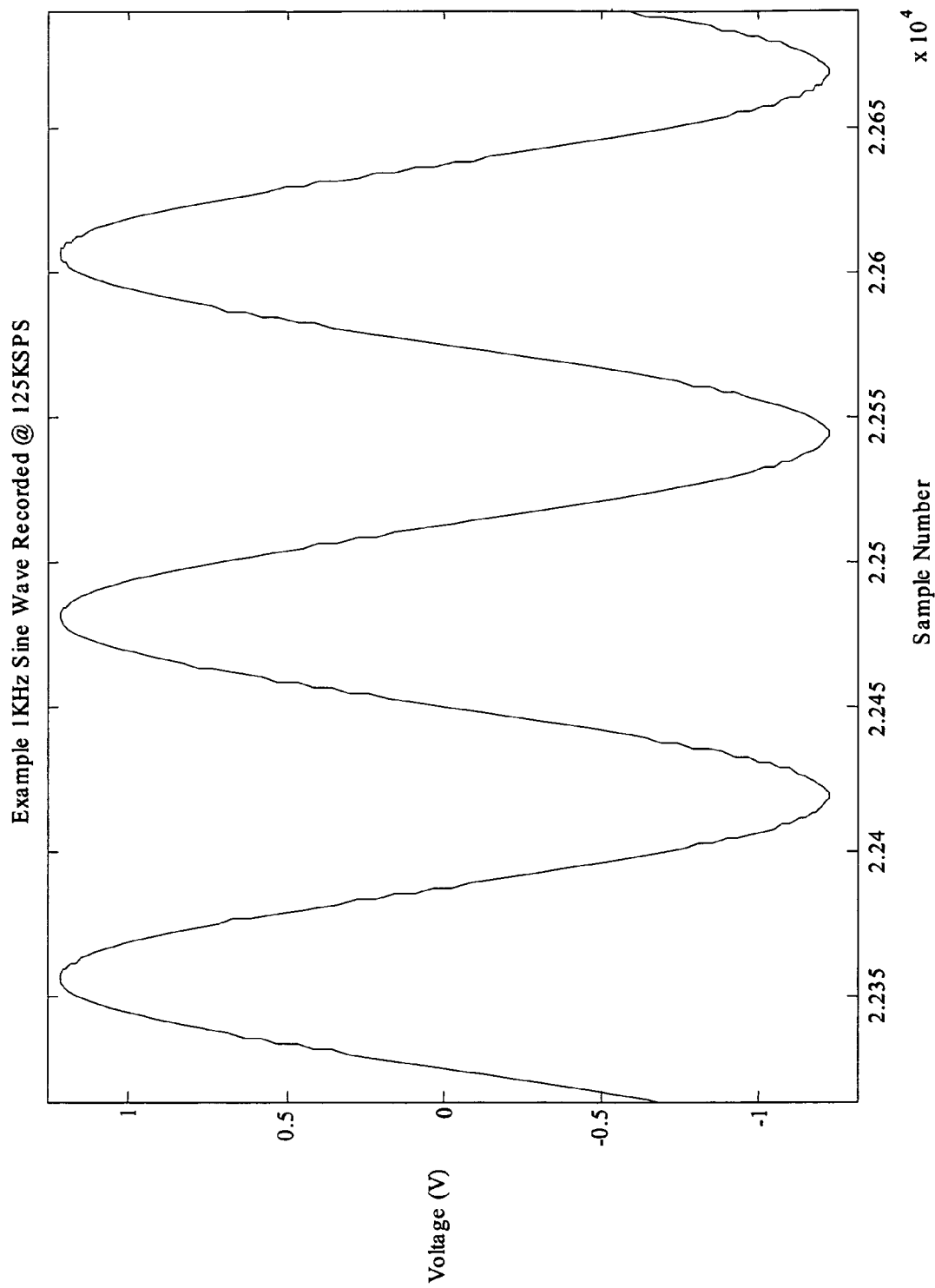
Figure 13:
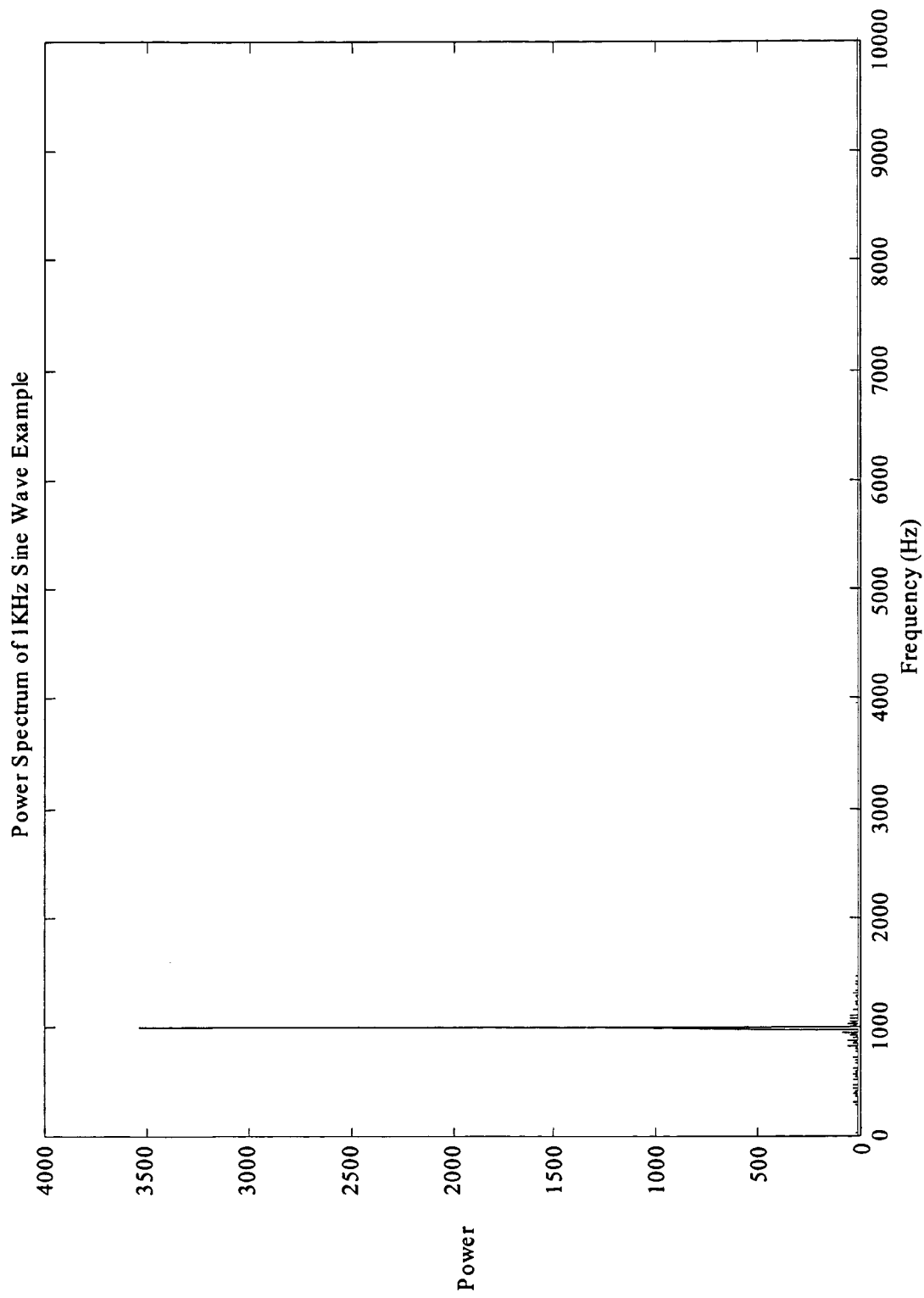

FIG. 11 through FIG. 13 show recorded data examples, which demonstrate basic signal integrity. These graphs analyze an input shorted noise measurement and a single 1.25V 1 kHz sine wave, both recorded on the integrated PDAS system 1000. FIG. 11 shows an example noise floor measurement and calculation. FIG. 12 shows an example of a 1.25V 1 kHz sine wave recorded with the inventive PDAS 1000. FIG. 13 shows a power spectrum of the 1 kHz sine wave from FIG. 12.

FIG. 14, FIG. 15A and FIG. 15B set forth various features of inventive embodiments such as bench model 1000. FIG. 14 more specifically describes features of bench model 1000 in terms of signal acquisition, computer support, data storage, power, and physical characteristics. FIG. 15A and FIG. 15B together more generally describe key system features of typical inventive embodiments in terms of profile, ruggedness, power, acoustics, channeling, networking, clocking and synchronization, and storage scalability. The present invention's portable data acquisition system was developed for a wide range of applications. FIG. 15A and FIG. 15B show just a few specifications that distinguish the inventive system from those already on the market.

FIG. 16 is informative about improvements to bench model 1000 that can be made according to inventive practice. That is, many inventive embodiments are possible that in one or more respects are better or more suitable for given applications than is the inventive bench model 1000 that is pictorially represented in FIG. 8. While the bench model 1000 has achieved all of its requirements, there are several inventive modifications with respect thereto that can promote or attain superior or optimal performance. These improvements include boosting of power supply, miniaturization of fuel cells, and enhanced digital-to-analog outputs.

Figure 20:
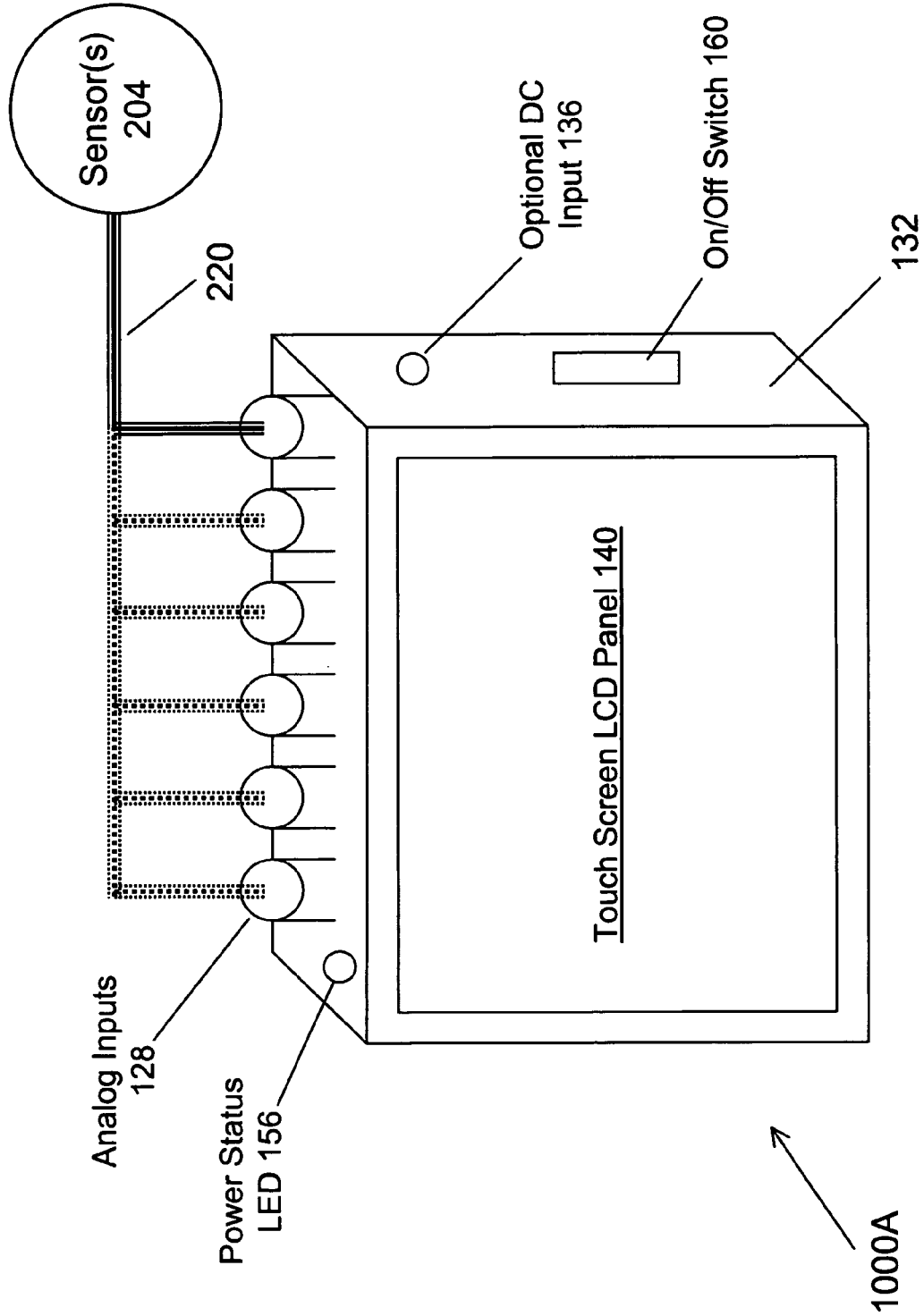
FIG. 20 is a diagrammatic perspective view of an embodiment of an interactive handheld PDAS in accordance with the present invention.

With reference to FIG. 17 through FIG. 21, the present invention's PDAS 1000 is versatile and is adaptable to multifarious applications of both situate (e.g., embedded) and handheld (e.g., interactive) genres. FIG. 17, FIG. 18, FIG. 18A and FIG. 18B illustrate a preferred inventive embodiment (or preferred inventive embodiments) for embedded applications. FIG. 19 through FIG. 20 illustrates a preferred embodiment for interactive applications. FIG. 21 illustrates inventive flexibility for a potential variety of applications, both embedded and interactive.

FIG. 17, FIG. 18, FIG. 18A and FIG. 18B illustrate an inventive "podded" module system 2000, which is designed to be rugged, silent, and capable of operating in the harsh, open-sea environment of a surface ship as well as in the deep-depth environment of a submarine. The present invention's externally mounted podded system 2000 bears some similarity to the U.S. Navy's Conformal Acoustic Velocity Sensor (CAVES) insofar as involving attachment of sensing capability the exterior of a marine vehicle. CAVES technology was at one time under consideration by the U.S. Navy, but was eventually rejected by the U.S. Navy because of the difficulty of connecting the CAVES system to the Onboard Data Acquisition System (ODAS). In contrast, the present invention's externally mounted system 2000 has its own self-contained data acquisition computer, thus representing a kind of "mini-ODAS" that obviates connection to onboard data acquisition equipment.

As shown in FIG. 17, FIG. 18, FIG. 18A and FIG. 18B, inventive podded system 2000 includes an inventive PDAS 1000, eleven sensors (e.g., accelerometers, velocimeters, and/or pressure sensors) 204, and a "pod" 208. Inventive podded system typically also includes one or more physical connections such as wires 220 shown in FIG. 19. According to some inventive embodiments, the use of wireless sensors 204 obviates the need for physical connectors such as wires 220. Thus, depending on the inventive embodiment, sensors 204 communicate with PDAS 1000 either remotely or via physical connections such as wires 220. Inventive podded system 2000 is representative of inventive situate embodiments for marine applications, according to which an inventive PDAS 1000 and at least one sensor 204 (and, if present, at least one wire 220) are contained in a pod 208. Data download and communication from inventive podded system 2000 can be through wireless network connection, such as Bluetooth™. According to some inventive embodiments, a magnetic induction charger 144 is also included in the inventive PDAS unit 1000 that is contained in pod 208. Using magnetic induction charger 144, the recharging of the batteries 120 is accomplished from outside pod 208 via magnetic induction, in the absence of direct electrical connection.

The inventive podded system 2000 depicted in FIG. 17, FIG. 18, FIG. 18A and FIG. 18B—more specifically, its pod 208—is designed to be low-profile and hydrodynamic, so as not to significantly disrupt the flow of water when submerged. An inventive pod 208 can be selectively shaped, including both top and bottom, for a given application. As shown in FIG. 18, pod 208 has a curved (or substantially curved) upper exterior surface 281 and a flat (or substantially flat) lower exterior surface 282. As shown in FIG. 18A and FIG. 18B, pod 208 has a curved (or substantially curved) upper exterior surface 281 and a curved (or substantially curved) lower exterior surface 282. The oval peripheral plan shape of pod 208—i.e., the oval perimeter defined or approximately defined by the planar surface 282—is apparent in FIG. 17.

Pod 208 as shown in FIG. 18, FIG. 18A and FIG. 18B has an upper exterior surface 281 and a lower exterior surface 282 that meet along their respective perimeters to form a junctional edge 289, pod 208 tapering in thickness toward junctional edge 289. However, according to inventive practice, the peripheral plan shape need not be regular or symmetrical. The peripheral plan shapes of pod 208 embodiments can vary in accordance with application requirements, having for instance a polygonal shape, a closed curved shape, or a closed curvilinear shape.

Pod 208 shown in FIG. 18 geometrically describes, both in profile and in three dimensions, a planoconvex shape, pod 208 being flat on one side (planar surface 282) and convex in three dimensions on the other side (convex surface 281). Pod 208 shown in FIG. 18A geometrically describes in profile (and perhaps also in three dimensions, depending upon the embodiment or application) a concavoconvex shape, pod 208 being concave in two or three dimensions on one side (planar surface 282) and convex in three dimensions on the other side (convex surface 281). Pod 208 shown in FIG. 18B geometrically describes in profile (and perhaps also in three dimensions, depending upon the embodiment or application) a convexoconvex (synonymously, double convex or bi-convex) shape, pod 208 being convex in two or three dimensions on one side (planar surface 282) and convex in three dimensions on the other side (convex surface 281).

According to typical inventive practice, pod 208 is characterized by flexibility, FIG. 18, FIG. 18A and FIG. 18B thus being different representations of the same flexible pod 208. Flexible pod 208 typically consists of or includes a flexible material such as an elastomeric material (e.g., natural or synthetic rubber). As shown in FIG. 18, flexible pod 208 is in its "default" condition, having a flat lower surface 282. Because pod 208 is flexible, it can adjoin, or substantially adjoin, not only flat surfaces but can also, within limits, accommodatingly bend so as to adjoin, or substantially adjoin, various curved surfaces such as shown in FIG. 18A and FIG. 18B. In addition to or as alternative to imbuing pod 208 with flexibility, inventive pod 208 can be made to have a "conformoconvex" shape. According to such inventive embodiments, upper surface 281 is selectively shaped to be convex, and lower surface 282 is selectively shaped (e.g., in a curved configuration; or, in a partly flat, partly curved configuration) to conform to a surface of interest. Lower surface 282 can have either a regular or irregular shape. Hence, FIG. 18, FIG. 18A and FIG. 18B can be understood to represent the same flexible pod 208, or different flexible pods 208, or different inflexible pods 208. In other words, the shapes shown FIG. 18, FIG. 18A and FIG. 18B, and a variety of other shapes, can be reached as either (i) a flexibly compliant deviation from original form or (ii) the original form itself.

Terms such as "planar," "flat," "convex," "planocovex," "convexoconvex," "bi-convex," "double convex" and "rectangular prism," as used herein, are not intended herein to suggest geometric exactitude. For instance, the terms "planar" and "flat," as used herein, synonymously denote definition, or approximate definition, or substantial definition, or general definition, of a geometric two-dimensional plane. Similarly, the terms "convex," "planoconvex" and "rectangular prism" do not necessarily suggest that these characterizations need be geometrically precise, but rather suggest that these characterizations can be approximately, substantially or generally so.

Figure 17:
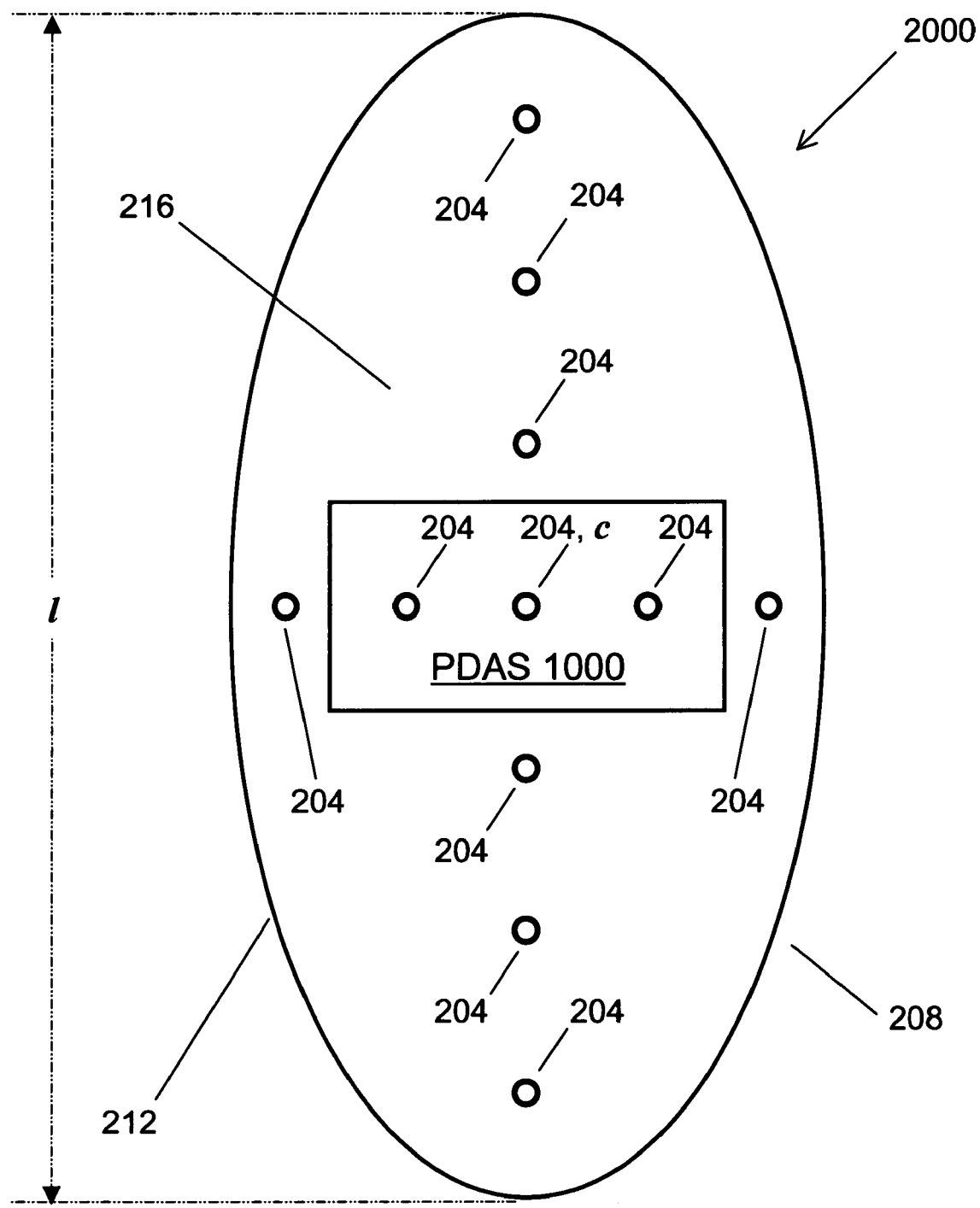
FIG. 17 is a plan view of an embodiment of a PDAS-inclusive, sensor-inclusive, "podded" device in accordance with the present invention. This inventive data acquisition and sensing device is typically embodied as having a low profile, curvilinear shape such as shown in FIG. 18, FIG. 18A and FIG. 18B.

The three-dimensional shape of convex surface 281 is similarly a variable characteristic, particularly with regard to the extent of bulging of the convex surface 281, measured herein in terms of the perpendicular height h of the highest point of the convex surface 281 from the planar surface 282. The pod 208 shown in FIG. 17 and FIG. 18 is symmetrical, height h connecting the highest point of convex surface 281 with the geometric center c of the oval planar surface 282. Dimensionally speaking, pod 208 is characterized not only by a height h (which is the longest distance from convex surface 281 to planar surface 282), but also by a length l, which is the longest distance across planar surface 282. Pod 208 as shown in FIG. 18 is characterized by a length-to-height ratio, l/h, of approximately ten (i.e., 10/1). According to most inventive embodiments involving marine applications, hydrodynamic considerations will dictate a sufficiently low profile for pod 208 and electro-mechanical considerations will dictate a sufficiently high profile for pod 208, dimensionally translating into an approximate range of length-to-height ratio l/h that is between about five (i.e., 5/1) and twenty (i.e., 20/1).

Pod 208 can comprise, for instance, a container (e.g., a pressure vessel) and/or an incompressible material (e.g., a conventional liquid acoustic material such as castor oil, or a conventional solid "potting" material such as polyurethane). The entire inventive podded unit 2000 is a continuous, integral piece with no pressure penetrations. The present invention's pod 208 typically has a convex exterior surface 281 that is characterized by convexity, smoothness and continuousness. In typical marine applications, for instance, planar surface 282 is attached (e.g., adhered) to a marine vessel, while convex surface 281 is exposed to the aqueous environment. The configuration of convex surface 281 is thus hydrodynamically propitious, e.g., in terms of minimizing the degree of drag or additional drag associated with the presence of pod 208 on the marine vessel.

Pod 208 is a pressure-resistant and completely sealed container that houses the electronic components, and in typical practice is quite small in size relative to the marine vessel to which it is attached. Pod 208 typically includes both an exterior shell 212 and an interior matrix material 216, the latter typically being a solid or liquid medium for at least substantially surrounding the electronic components. Inventive podded system 2000 can be made according to various approaches, including the following: (i) an approach involving encapsulation by and molding of a potting material; or, (ii) an approach involving containment of acoustic fluid by a pressure vessel; or, (iii) an approach involving containment of PDAS 1000 by a pressure vessel and encapsulation by and molding of an elastomeric material. According to some encapsulation/molding embodiments of inventive podded system 2000, pod 208 includes a matrix material 216 but does not include a shell 212. Regardless of the fabrication methodology, the present invention's pod 208 can be imbued with hydrodynamic qualities in terms of shape, such as noted hereinabove. If pod 208 includes both a matrix material 216 and a shell 212, the lower surface 281 and the upper surface 282 are surfaces of shell 212. If pod 208 includes a matrix material 216 but not a shell 212, the lower surface 281 and the upper surface 282 are surfaces of matrix material 216. In the light of the instant disclosure, ordinarily skilled artisans will understand and be capable of practicing various methods and techniques for making an inventive podded system 2000.

As noted hereinabove, a first approach to fabricating inventive podded system 2000 involves encapsulation (molding) of components in a potting material such as polyurethane. According to one fabrication method using potting material 216, the inventive PDAS unit 1000 and the one or more sensors 204 (and, if present, the one or more wires 220) are encapsulated in potting material (e.g., a polymeric material such as including polyurethane) 216 and a surrounding pod shell 212 to create a complete inventive podded system 2000 assembly. In the encapsulation procedure, the pod shell 212 (which can be, but is not necessarily, a pressure vessel) is enclosed around PDAS unit 1000 and sensor(s) 204 (and, if present, wire(s) 220), and the combination is molded (e.g., injection molded) into an integral podded system 2000 unit using potting material 216.

As also previously noted herein, according to some inventive embodiments, pod 208 includes potting material 216 but lacks a shell 212. Here, the potting material 216 itself forms a hydrodynamic exterior surface such as discussed hereinabove; that is, the lower surface 281 and the upper surface 282 are surfaces of matrix material 216. According to one fabrication method, inventive PDAS unit $1000_S$ and sensor(s) 204 (and, if present, wire(s) 220) are molded in place in the potting material 216 in such a way that inventive PDAS unit 1000 and sensor(s) 204 (and, if present, wire(s) 220) are encased in potting material 216 in the absence of any housing such as pod shell 212.

As further noted hereinabove, according to some inventive embodiments, pod 208 includes an exterior shell 212 that is a pressure vessel, and an interior matrix material 216 that is an acoustically transparent fluid (typically, a liquid, e.g., an oil such as castor oil). The electronic components and the acoustic fluid 216 are contained in the pressure vessel 212. According to one fabrication method, inventive PDAS unit 1000 and sensor(s) 204 (and, if present, wire(s) 220) are placed inside pressure vessel 212, which is then filled with acoustic fluid 216. Prior to filling pressure vessel 212 with acoustic fluid 216, PDAS unit 1000 can be attached to a portion of the inside surface of pressure vessel 212, such as inside central lower surface portion 250 shown in FIG. 18.

As previously discussed herein, many inventive embodiments of podded unit 2000 include a flexible pod 208, podded unit 2000 thereby being a versatile, bendable device that is capable of abutting or substantially abutting attachment with respect to flat surfaces as well as multifariously shaped surfaces that generally define, albeit with some deviation from, a geometric plane. According to one inventive method that is especially well suited for fabricating a flexible podded unit 2000, in the interior of pod 208 is a pressure vessel 240 (such as shown in FIG. 18B) that contains inside it a PDAS unit 1000. Interior pressure vessel 240 (which encloses PDAS unit 1000) and sensor(s) 204 (and, if present, wire(s) 220) are molded in place in elastomeric material 216 in such a way that interior pressure vessel 240 and sensor(s) 204 (and, if present, wire(s) 220) are encased in elastomeric material 216 in the absence of any housing such as pod shell 212.

Lower surface 282 of pod 208 can be conformally attached (e.g., flush-mounted or nearly flush-mounted) on a complementarily shaped (flat, nearly flat, slightly curved, moderately curved, etc.) surface such as may exist on a marine hull. For instance, the inventive podded unit 2000 can be glued onto model-scale or full-scale vehicles using an epoxy resin (e.g., polyester resin concrete, or PRC) under a vacuum, with vacuum channels machined into the lower surface (underside) 282 of the pod 208. A "sensor array" of podded units 2000 can be placed almost anywhere on a marine vessel, e.g.: on the hull; on the top of the rudder; on the side of the rudder; on the stem planes; anywhere on the sail; and/or, on the stem cone to beam form toward the control surfaces. Furthermore, the inventive podded unit 2000 is not limited to locations where the Onboard Data Acquisitions System (ODAS) and power can be accessed through hull penetrators.

Inventive podded unit 2000 shown in FIG. 17 and FIG. 18 is an example of embedded practice in accordance with the present invention. Another example of an inventive situate device is shown in FIG. 19. Inventive podded unit 2000

(shown in FIG. 17 and FIG. 18) and inventive podded unit 2000A (shown in FIG. 19) are characterized by different shapes and are suitable for different purposes. As distinguished from inventive podded unit 2000 shown in FIG. 17 and FIG. 18, inventive podded unit 2000A shown in FIG. 19 includes an inventive PDAS unit 100 but does not include any sensors 204. The present invention's PDAS unit 100 is embedded in a cylindrical pod 208. Pod 208 can include both a matrix material 216 and a shell 212, or can include a matrix material 216 but not include a shell 212. Further, either of the aforediscussed approaches, viz., the potting material encapsulation approach (wherein matrix material 26 is molded in a cylindrical shape) or the acoustic fluid approach (wherein shell 212 is a cylindrically shaped pressure vessel), can be adopted for making inventive podded unit 2000A. As examples of inventive applications, an inventive podded unit 2000 having dimensions 3.5"×3.5"×7" can be mounted inside a sail or other wet compartment or a rotating hub. The pod 208 can be provided with penetrations for network communication, battery recharging, and cables to be run to various locations to mounted sensors.

Because of the high performance of the inventive system, its small form factor and its easily integrated video output, the inventive PDAS unit 1000 very much lends itself to being an interactive handheld device such as a PDAS test unit 1000A shown in FIG. 20. This kind of inventive device can utilize a small touchscreen LCD panel 140 to provide both input and output to the user. Another option is a DC input 136. Windows can be the operating system, and Labview can be used as the software to provide real-time data analysis in the field. FIG. 20 portrays the layout of an embodiment of an inventive handheld interactive unit 1000A. Shown in FIG. 20 are analog inputs 128, direct current input 136, touchscreen LCD panel 140, power status LED 156, on/off switch 160, and outer casing 132. One or more sensors 204 can be connected externally to inventive handheld unit 1000A—more specifically, to one or more analog-to-digital converters 108 via analog input (e.g., serial) ports 128. A sensor 204 can be connected to inventive handheld unit 1000A in a closely coupled manner, e.g., by directly connecting to an analog input port 128 or by using an adapter for this type of connection. Alternatively, a wire connector 220 such as shown in FIG. 2 can be used to connect sensor 202 to analog input port 128. As shown in FIG. 20, casing 132 describes, with some approximation, a geometric rectangular prism shape having six geometric sides or faces, wherein the touchscreen display 140 is situated on one geometric side or face.

Figure 22:
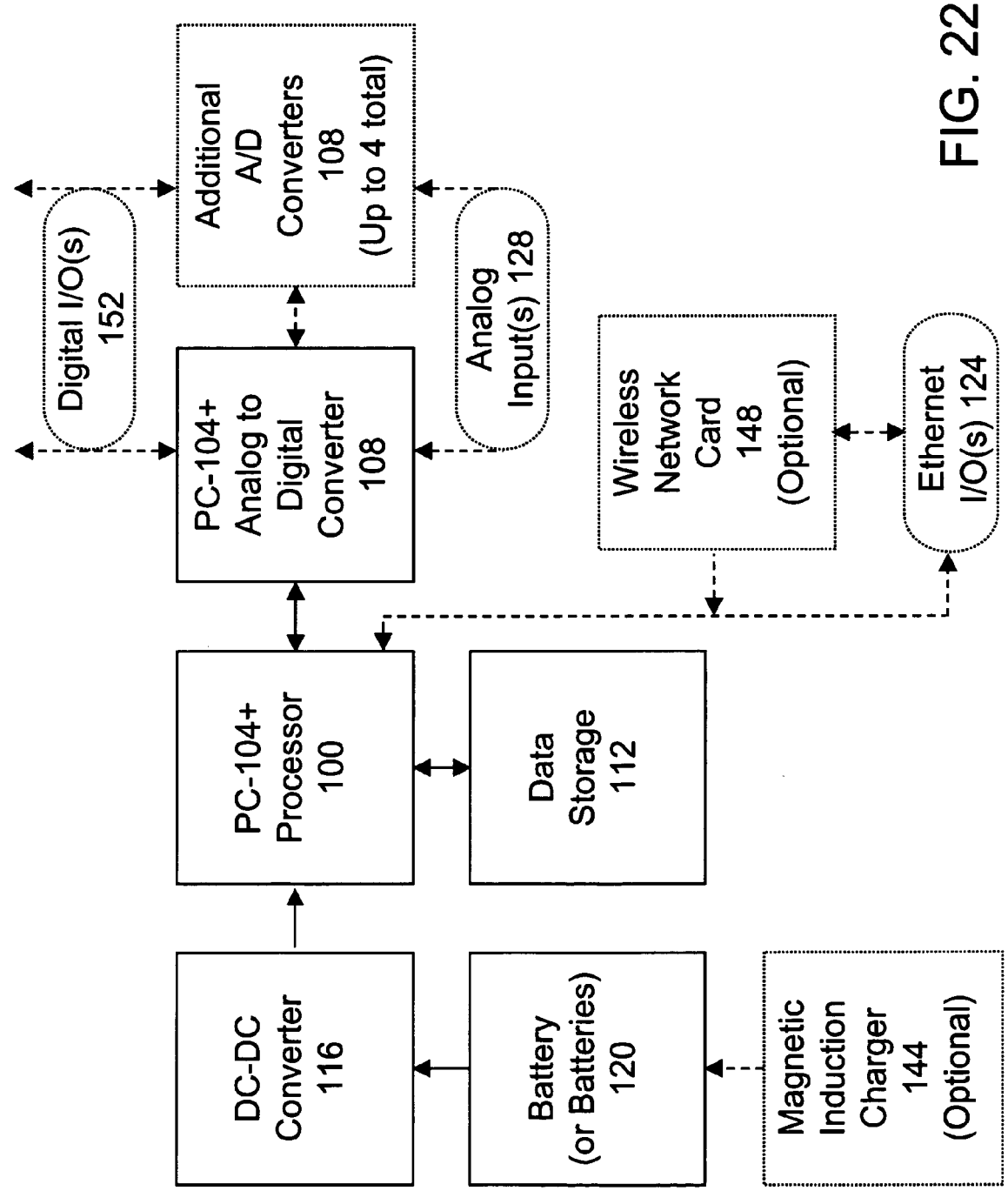
FIG. 22 is a schematic of another inventive embodiment similar to that shown in FIG. 2, particularly illustrating the inclusion of a magnetic induction charger and a wireless network card, either or both being optional peripherals for the inventive embodiment shown in FIG. 2.

FIG. 21 shows a block diagram of an embodiment of an inventive handheld interactive unit 1000A. FIG. 21 represents a somewhat modified version of the block diagram of the core inventive system that is shown in FIG. 2; as illustrated in FIG. 21, the only hardware change that the core inventive system typically requires to make the inventive device into a fully interactive test platform is the addition of a user interface that includes video/graphic output. The block diagram of FIG. 22 illustrates the versatility and expansiveness of an inventive PDAS unit, whether used in situate (e.g., PDAS unit 1000) or handheld (e.g., PDAS unit 1000A) fashion. Shown in FIG. 22, but not shown in FIG. 2, are magnetic charger 144, wireless network card 148, and digital input(s) or output(s) 152.

A handheld inventive system such as interactive unit 1000A may have commercial appeal. Handheld models on the market might have any of several deficiencies. First of all, the average sample rate of most conventional devices is 20 KSPS per channel, well below the required sample rate for most vibration and acoustic measurements; in contrast, the handheld inventive system allows for speeds up to 220 KSPS. Furthermore, most conventional recorders only have data storage capacities in the megabyte range; in contradistinction, the inventive PDAS can have up to several hundred gigabytes. Moreover, current handheld systems use a proprietary non-customizable software interface; by comparison, by using Windows and Labview, the operator of the present invention's handheld system will have the flexibility to setup the test environment to his/her liking. Essentially, this will allow the practitioner of the present invention to take the familiarity, ease, and power of a desktop or rack-mount computer into the field.

While some known laptop acquisition systems also attempt to provide high-powered systems in the field, they too have their disadvantages. Most current laptop systems use a laptop connected to a separate acquisition device via a USB, serial, parallel, or Ethernet cable. Firstly, conventional laptop systems are not especially portable, since several components are required to be used. In addition, the secondary device typically cannot run off of battery power, again reducing the conventional laptop system's portability. Further, depending on the device connection, the total throughput of a conventional system may range from only several kilobytes per second for a serial port, to up to a few megabytes for an Ethernet connection. By comparison, since the acquisition card in the inventive PDAS is connected via a PCI connection, the present invention's maximum data throughput can be as high as 132 MB.

The present invention is not to be limited by the embodiments described or illustrated herein, which are given by way of example and not of limitation. Other embodiments of the present invention will be apparent to those skilled in the art from a consideration of this disclosure or from practice of the present invention disclosed herein. Various omissions, modifications and changes to the principles disclosed herein may be made by a person skilled in the art without departing from the true scope and spirit of the present invention, which is indicated by the following claims.

What is claimed is:

1. An apparatus for performing underwater sensing and for acquiring acoustic data based on said sensing, the apparatus comprising a data acquisition device, at least one sensor, a pressure vessel, and an elastomeric body, said pressure vessel being an incompressible, completely sealed, and pressure-resistant container, said pressure vessel being resistant to pressures associated with deep water depths and having no pressure penetrations in deep water depths, said elastomeric body being constituted by an incompressible and acoustically transparent material, said elastomeric body having a hydrodynamic and substantially continuous exterior surface approximately defining a planoconvex three-dimensional geometric shape, said exterior surface including a smooth convexly curved surface portion and an approximately planar surface portion that are generally oppositely facing and that meet to form a junctional edge along the respective perimeters of said convexly curved surface portion and said approximately planar surface portion, said elastomeric body being characterized by a thickness between said convexly curved surface portion and said approximately planar surface portion, said elastomeric body tapering in said thickness toward said junctional edge, said pressure vessel containing said data acquisition device and protecting said data acquisition device during underwater operation of the apparatus including in deep water depths, said elastomeric body representing a matrix having embedded therein said pressure vessel and said at least one sensor, said data acquisition device including a processor for receiving signals from said at least one sensor; wherein said data acquisition device further includes:
- a dc power supply;
- a dc-dc converter for adapting voltage received from said dc power supply to said processor;
- a magnetic induction charger for recharging said dc power supply from a location outside said data acquisition device via magnetic induction and in the absence of direct electrical connection;
- a memory for storing data associated with said processor;
- a wireless network card for wireless digital communication between said processor and a location outside said data acquisition device, said wireless digital communication including at least one of control and data transfer;
- a wired network card for wired digital communication between said processor and a location outside said data acquisition device, said wired communication including at least one of control and data transfer;
- at least one digital input for receiving wireless digital data from said at least one sensor;
- at least one analog input for receiving wired analog data from said at least one sensor.

2. The apparatus of claim 1, wherein said apparatus further comprises at least one wire for transmitting said signals from said at least one sensor to said processor.

3. The apparatus of claim 1, wherein said at least one sensor is selected from the group consisting of motion sensor and pressure sensor.

4. The apparatus of claim 1, wherein:
- said planoconvex three-dimensional geometric shape is characterized by a maximum height;
- said maximum height is the distance between said approximately planar surface portion and the location of maximum convexity of said convexly curved surface portion;
- said approximately planar surface portion defines a two-dimensional closed geometric figure characterized by said perimeter;
- said planoconvex three-dimensional geometric shape is characterized by a maximum length;
- said maximum length is the furthest distance between two locations on said perimeter;
- the ratio between said maximum length and said maximum height is in the range between five and twenty.

5. The apparatus of claim 1, wherein said approximately planar surface portion defines a two-dimensional closed geometric figure that has said perimeter and that is symmetrical about a center location of said approximately planar surface portion, and wherein the location of maximum convexity of said convexly curved surface portion is substantially aligned with said center location.

6. The apparatus of claim 1, wherein if said approximately planar surface portion is attached to a marine vessel so that said convexly curved surface portion is exposed to water when the apparatus is submerged during navigation of said marine vessel, then the apparatus is characterized by minimal flow disturbance during the submergence of the apparatus.

7. The apparatus of claim 1, wherein:
- said exterior surface is an exterior elastomer surface;
- the apparatus further comprises a shell having a substantially continuous exterior shell surface;
- said shell encapsulates said elastomeric body conformally with respect to said exterior elastomer surface so that said exterior shell surface approximately defines said planoconvex three-dimensional geometric shape.

8. The apparatus of claim 7, wherein:
- said shell is made of a material selected from the group consisting of metal material, composite material, and plastic material;
- said elastomeric body is made of a polymeric material that includes polyurethane.

9. The apparatus of claim 7, wherein said elastomeric body imparts flexibility to the apparatus that facilitates attachment of the apparatus to an entity whereby said approximately planar surface portion adjoins a curved surface of said entity.

10. The apparatus of claim 7, wherein said approximately planar surface portion has a shape that is planar or moderately convex or moderately concave.

11. The apparatus of claim 1, wherein said elastomeric body is made of a polymeric material that includes polyurethane.

12. The apparatus of claim 1, wherein said elastomeric body imparts flexibility to the apparatus that facilitates attachment of the apparatus to an entity whereby said approximately planar surface portion adjoins a curved surface of said entity.

13. The apparatus of claim 1, wherein said approximately planar surface portion has a shape that is planar or moderately convex or moderately concave.

14. The apparatus of claim 1, wherein resident in said memory is a computer program product including a computer useable medium having computer program logic recorded thereon for enabling the processor to process power spectrum data related to said signals received by said processor from said at least sensor, said power spectrum data including power spectrum data on a time series signal from at least one said sensor.

15. A method for performing underwater sensing and for acquiring acoustic data based on said sensing, said method comprising attaching a self-contained unit to an object, said self-contained unit including a data acquisition device, at least one sensor, a pressure vessel enclosing said data acquisition device, and an elastomeric pod representing a matrix having embedded therein said pressure vessel and said at least one sensor, said data acquisition device including a dc power supply and a processor for receiving signals from said at least one sensor, said elastomeric pod having a hydrodynamic planoconvex outside pod surface that includes a smooth convexly curved outside pod surface and a flat outside pod surface that border on each other so as to describe a junctional edge along the periphery of said planoconvex outside pod surface, said junctional edge bounding said convexly curved outside pod surface and said flat outside pod surface, said elastomeric pod being characterized by a thickness between said convexly curved outside pod surface and said flat outside pod surface, said elastomeric pod tapering in said thickness toward said junctional edge, said object having an outside object surface, said attaching including adjoining said flat outside pod surface to said outside object surface, said pressure vessel being an incompressible, completely sealed, and pressure-resistant container, said pressure vessel being resistant to pressures associated with deep water depths and having no pressure penetrations in deep water depths, said pressure vessel protecting said data acquisition device during underwater operation of said self-contained unit including in deep water depths, said elastomeric pod being constituted by an incompressible and acoustically transparent material, the method further comprising:
- using said processor for processing power spectrum data related to said signals received by said processor from said at least sensor, said power spectrum data including power spectrum data on a time series signal from at least one said sensor;

using a memory for storing data associated with said processor;

using a magnetic induction charger for recharging said dc power supply from a location outside said data acquisition device via magnetic induction and in the absence of direct electrical connection;

using a dc-dc converter for adapting voltage received from said dc power supply to said processor;

using a wireless network card for effecting wireless digital communication between said processor and a location outside said data acquisition device, said wireless digital communication including at least one of control and data transfer;

using a wired network card for effecting wired digital communication between said processor and a location outside said data acquisition device, said wired communication including at least one of control and data transfer;

using at least one digital input for receiving wireless digital data from said at least one sensor;

using at least one analog input for receiving wired analog data from said at least one sensor.

16. The method of claim 15 wherein said object is a marine vessel, and wherein said attaching is performed so that said smooth convex outside pod surface but not said flat outside pod surface is exposed, and so that said planoconvex outside pod surface has a minimal amount of drag associated therewith when said self-contained unit is in an attached state with respect to said marine vessel during travel.

17. The method of claim 15, further comprising communicating with said self-contained unit from a remote location.

18. The method of claim 15 wherein:
said outside object surface includes a flat object surface; and
said attaching includes adjoining said flat outside pod surface to said flat outside object surface so that said flat outside pod surface is at least substantially conformal with respect to said flat outside object surface.

19. The method of claim 15 wherein:
said pod is flexible;
said outside object surface includes a curved object surface; and
said attaching includes adjoining said flat outside pod surface to said curved outside object surface so that said flat outside pod surface assumes a curvature that is at least substantially conformal with respect to the curvature of said curved outside object surface.

20. The method of claim 15 further comprising:
sensing at least one condition of said self-contained unit; and
initiating operation of said processor upon realization of said at least one condition, said initiating operation including using at least one said analog input for receiving sensory data pertaining to said at least one condition, said at least one condition including a particular depth of said self-contained unit.

\* \* \* \* \*